(12) United States Patent
Cairns

(10) Patent No.: US 8,175,630 B2
(45) Date of Patent: May 8, 2012

(54) METHOD OF CLOSED LOOP POWER CONTROL ADJUSTED BY SELF-INTERFERENCE

(75) Inventor: Douglas A. Cairns, Durham, NC (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 404 days.

(21) Appl. No.: 12/500,856

(22) Filed: Jul. 10, 2009

(65) Prior Publication Data

US 2011/0009150 A1   Jan. 13, 2011

(51) Int. Cl.
*H04B 7/00* (2006.01)
(52) U.S. Cl. ........ 455/522; 455/69; 455/452.2; 455/135
(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| | | | | |
|---|---|---|---|---|
| 6,249,683 B1* | 6/2001 | Lundby et al. | ................. | 455/522 |
| 6,807,227 B2* | 10/2004 | Chien | ........................... | 375/224 |
| 7,773,704 B2* | 8/2010 | Buchert et al. | ................ | 375/346 |
| 2006/0154608 A1* | 7/2006 | Fukuoka et al. | ........... | 455/67.13 |
| 2006/0239179 A1* | 10/2006 | Berkeman et al. | ............ | 370/208 |
| 2007/0041431 A1* | 2/2007 | Reial | ............................. | 375/147 |
| 2007/0259682 A1* | 11/2007 | Kaikkonen et al. | ........... | 455/522 |
| 2008/0039128 A1* | 2/2008 | Ostman et al. | ................. | 455/522 |
| 2008/0153494 A1* | 6/2008 | Kazmi et al. | .................. | 455/436 |
| 2008/0194286 A1* | 8/2008 | Chen et al. | .................... | 455/522 |
| 2008/0274763 A1* | 11/2008 | Baker et al. | ................... | 455/522 |
| 2011/0007829 A1* | 1/2011 | Kumar et al. | ................. | 375/260 |

FOREIGN PATENT DOCUMENTS

WO   WO 2008/028321 A1   3/2008

\* cited by examiner

*Primary Examiner* — Dominic E Rego

(57) ABSTRACT

A method and apparatus for controlling the transmit power of a mobile device in a mobile communication network takes the level of self-interference into account to perform inner-loop power control. For normal inner-loop power control, a signal quality estimate is compared to a signal quality target and power control commands are generated based on the comparison. When self-interference is the dominant impairment in the received signal, a "fast break" is introduced to change inner-loop power control command generation. The amount of self-interference is determined based on the delay spread of the channel.

10 Claims, 4 Drawing Sheets

METHOD OF CLOSED LOOP POWER CONTROL ADJUSTED BY SELF-INTERFERENCE

BACKGROUND

The present invention relates generally to power control for high speed packet data access in mobile communication networks.

The current Universal Mobile Telecommunication System (UMTS) standard implements uplink power control to control the transmit power of mobile terminals on uplink channels. The uplink transmit power control procedure simultaneously controls the power of a Dedicated Physical Control Channel (DPCCH) and its corresponding Dedicated Physical Data Channels (DPDCHs), High Speed Dedicated Physical Control Channel (HS-DPCCH), and Enhanced Dedicated Physical Control and Data Channels (E-DPCCH and E-DPDCH). The power control procedure in UMTS includes inner-loop power control and outer-loop power control. Inner-loop power control compares a signal-to-interference ratio (SIR) of a received signal from a mobile terminal with an SIR target to generate transmit power control (TPC) commands to instruct the mobile terminal to either increase or decrease its transmit power. Outer-loop power control adjusts the SIR target to obtain a certain quality of service (QoS). For example, adjustment of the SIR target may be made to maintain a desired block error rate (BLER).

With higher data rates in the uplink, a higher chip energy-to-noise ratio ($E_c/N_0$) is needed in order to support the desired throughput. Multi-path propagation in combination with high transmission power ($E_c/N_0 > 0$ dB) may cause severe self-interference that, in some cases, dominates other interference in the received signal and degrades the overall performance of the mobile terminal. When self-interference is dominant, the received SIR may not be able to reach the SIR target, irrespective of the mobile terminal transmit power because increasing the transmit power also increases the self-interference. In this scenario, inner-loop power control continues to ask the mobile terminal to increase its transmit power, which leads to an undesirable power rush, possible system instability, and serious interference that affects other users' performance.

One possible solution to this problem is to exclude self-interference from the SIR estimation process. For example, an interference suppression receiver, such as a GRAKE receiver, may be used to suppress self-interference when demodulating the received signal. SIR may then be estimated after GRAKE combining. This method has the advantage of being straightforward and the estimated SIR reflects the actual SIR experienced by the modem. However, using an interference suppression receiver to suppress self-interference may not be sufficient to avoid power rushes at high data rates.

Another possible solution is to compute a modified SIR that excludes self-interference and to use the modified SIR for inner-loop power control. The TPC commands are then generated based on the relation between the modified SIR, with self-interference excluded, and the SIR target. However, there is always some residual self-interference that cannot be removed. Further, it may be difficult to accurately estimate the modified SIR at high data rates. Moreover, signal quality is actually affected by self-interference even if the self-interference is discounted when computing the SIR. Removing the effect of self-interference from the SIR estimate results in worse signal quality for a given SIR target and causes the outer-loop power control to compensate for the self-interference.

Another possible solution is to take self-interference into account when determining the data transmission rates for the mobile terminal. When self-interference is dominant, the uplink scheduler may avoid scheduling high data rate transmissions. However, there is an inherent delay in the scheduling process. Consequently, the scheduler cannot respond quickly enough to rapidly changing channel conditions.

U.S. patent application Ser. No. 12/22,346 filed Jan. 30, 2008, titled "Method of Closed Loop Power Control Adjusted by Self-Interference" describes a method of closed loop power control that takes into account the level of self-interference in the received signal when generating power control commands. When the level of self-interference is low, a normal inner-loop power control procedure may be used wherein the signal-to-interference ratio (SIR) of the receive signal is compared to an SIR target to generate power control commands. When the level of self-interference is high, a "fast break" procedure is used for inner-loop power control to constrain further increases in mobile terminal transmit power until the level of self-interference returns to an acceptable level. The "fast break" procedure may reduce the mobile station transmit power, maintain the mobile station transmit power at current levels, or limit further increases in the mobile terminal transmit power. The use of fast break procedures is triggered based on an instantaneous estimate of the orthogonality factor, which can be difficult to compute.

SUMMARY

The present invention provides a reduced complexity method of closed loop power control that takes into account the level of self-interference in the received signal when generating power control commands. A base station varies transmit power control command generation based on the delay spread of the channel. In general, the amount of self-interference increases with increasing delay spread. Therefore, the delay spread can be used as an indication of the self-interference. When the level of self-interference is low, a normal inner-loop power control procedure may be used wherein the signal-to-interference ratio (SIR) of the receive signal is compared to an SIR target to generate power control commands. When the level of self-interference is high, a "fast break" procedure is used for inner-loop power control to constrain further increases in mobile terminal transmit power until the level of self-interference returns to an acceptable level. The "fast break" procedure may reduce the mobile station transmit power, maintain the mobile station transmit power at current levels, or limit further increases in the mobile terminal transmit power. In some embodiments, the SIR target set by outer-loop power control may be modified when the level of self-interference is high to prevent power rushes. Also, the level of self-interference may be provided to an uplink scheduler so that the scheduler may avoid scheduling high data rate transmissions while the level of self-interference is high.

The use of a delay spread estimate to trigger the fast break procedure significantly reduces the complexity of the closed loop power control mechanism and avoids power rushes and possible system instability when the level of self-interference is high.

DETAILED DESCRIPTION

Figure 1:
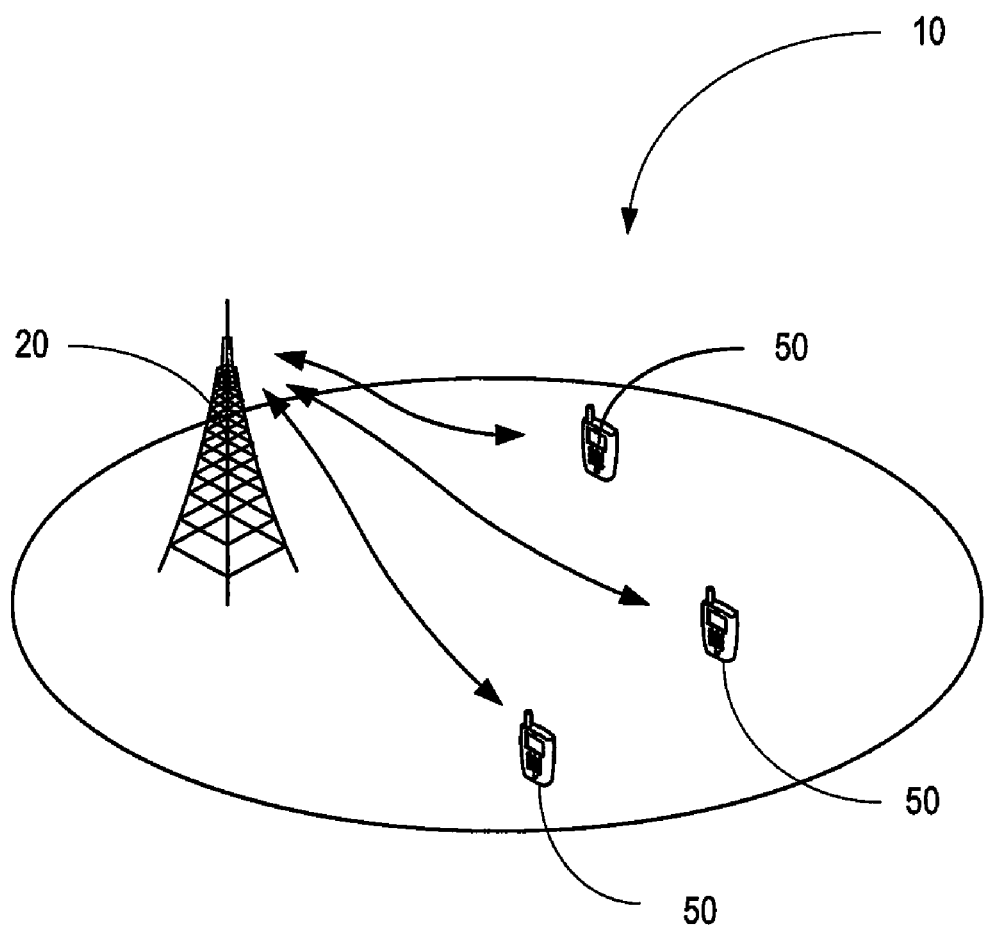
FIG. 1 is schematic diagram of a mobile communication network.

Referring now to the drawings, the present invention will be described in the context of a Third Generation (3G) mobile communication network, such as a UMTS network. Those skilled in the art will appreciate, however, that the present invention is applicable to systems implementing other standards. Therefore, the description should not be construed as limiting the present invention to UMTS networks.

FIG. 1 presents a simplified illustration of a mobile communication network 10 for supporting wireless communications by a plurality of mobile terminals 50. While FIG. 1 shows a single base station 20 communicating with the mobile terminals 50, those skilled in the art will appreciate that a typical communication network 10 comprises many base stations 20. Base station 20 transmits data to the mobile terminals 50 over one or more downlink channels, and receives data from the mobile terminals 50 over one or more uplink channels. The downlink and uplink channels may comprise dedicated channels, common channels, or a mixture thereof. In the current release of the UMTS standard, the physical channels for the uplink include the dedicated physical control channel (DPCCH), the dedicated physical data channel (DPDCH), the enhanced dedicated physical control channel (E-DPCCH), the enhanced dedicated physical data channel (E-DPDCH), and the high-speed dedicated physical control channel (HS-DPCCH).

Base station 20 simultaneously controls the transmit power of the mobile terminals 50 on the DPCCH, DPDCH, E-DPCCH, E-DPDCH, and HS-DPCCH. An inner power control loop sets the transmit power of the mobile terminals 50 on the DPCCH by comparing the signal-to-interference ratio (SIR) of the received DPCCH signal to an SIR target. The SIR target is set by outer-loop power control and can be driven by the block error rate (BLER) on the DPDCH, or the number of retransmissions of the E-DPDCH. The mobile terminal transmit power on the DPDCH, E-DPCCH, E-DPDCH, and HS-DPCCH are set relative to the transmit power of the DPCCH. Thus, a single power control mechanism controls the transmit power of the mobile terminal 50 on all of the uplink physical channels.

The SIR on the DPCCH may be modeled by:

$$SIR = \frac{E_c}{I_{ISI} + I_{other} + N_0}, \quad (1)$$

where $E_c$ represents the chip energy, $I_{ISI}$ represents intersymbol interference (e.g., self-interference), $I_{other}$ represents interference from other users, and $N_0$ represents thermal noise. A modified SIR, denoted herein as MSIR, is the SIR with self-interference suppressed and is given by:

$$MSIR = \frac{E_c}{I_{other} + N_0}. \quad (2)$$

According to embodiments of the present invention, the level of self-interference is taken into account in performing uplink power control. When self-interference is the dominant impairment (dominating the total SIR), the power control command generation is modified to avoid power rushes and system instability. Changes in power control command generation may be accomplished by changing the way the inner-loop power control generates power control commands, and/or by adjusting the SIR target used by inner-loop power control. The level of self-interference may be determined based on the delay spread of the channel. For example, whether the self-interference is dominant may be determined by comparing the delay spread of the channel, denoted $\tau_{rms}$, to a threshold $\psi_{rms}$. A delay spread $\tau_{rms}$ larger than the threshold $\psi_{rms}$ may be taken as an indication that self-interference is the dominant factor in the SIR estimate.

When self-interference dominates the SIR estimate, a power control unit uses a "fast break" procedure for inner-loop power control. Otherwise, normal SIR-based inner-loop power control is used. In one exemplary embodiment, a "fast break" is introduced into the inner-loop power control process to interrupt normal SIR-based power control command generation. In one exemplary embodiment, the inner-loop power control may be configured to reduce or maintain the current transmit power level of the mobile terminal 50, irrespective of the relationship between the received SIR and the SIR target. This procedure effectively decouples the power control command generation from the received SIR.

Various techniques may be used to implement a fast break in the inner-loop power control. In one embodiment, a fast break may be achieved by commanding the mobile terminal 50 to reduce its transmit power even when the SIR is lower than the SIR target. In an alternative embodiment, a "fast break" may be achieved in the inner-loop power control by replacing current SIR estimates with a value that is larger than the SIR target. For example, the current SIR estimate may be replaced with a value that is as high as 10,000 times the current SIR estimate. Replacing the current SIR estimate with a value higher than the SIR target guarantees that the inner-loop power control generates a command to decrease the transmit power.

In other embodiments of the invention, power control command generation may be changed by adjusting the SIR target. Lowering the SIR target causes the inner-loop power control to issue fewer up commands. SIR target adjustment may be used in place of the fast break procedure for inner-loop power control, or in combination with the fast break procedure. For example, SIR target adjustment may be used when the fast break procedure fails to bring the self-interference level down to an acceptable level.

Those skilled in the art will appreciate that both the fast break procedure and the SIR target adjustment procedure causes an increase in the error rate. In this case, a retransmission protocol, such as hybrid ARQ, may be used to request retransmission of erroneously received data blocks. However, this effectively reduces the data throughput because more data blocks will be retransmitted when the fast break procedure or the SIR target adjustment procedure is used.

Figure 2:
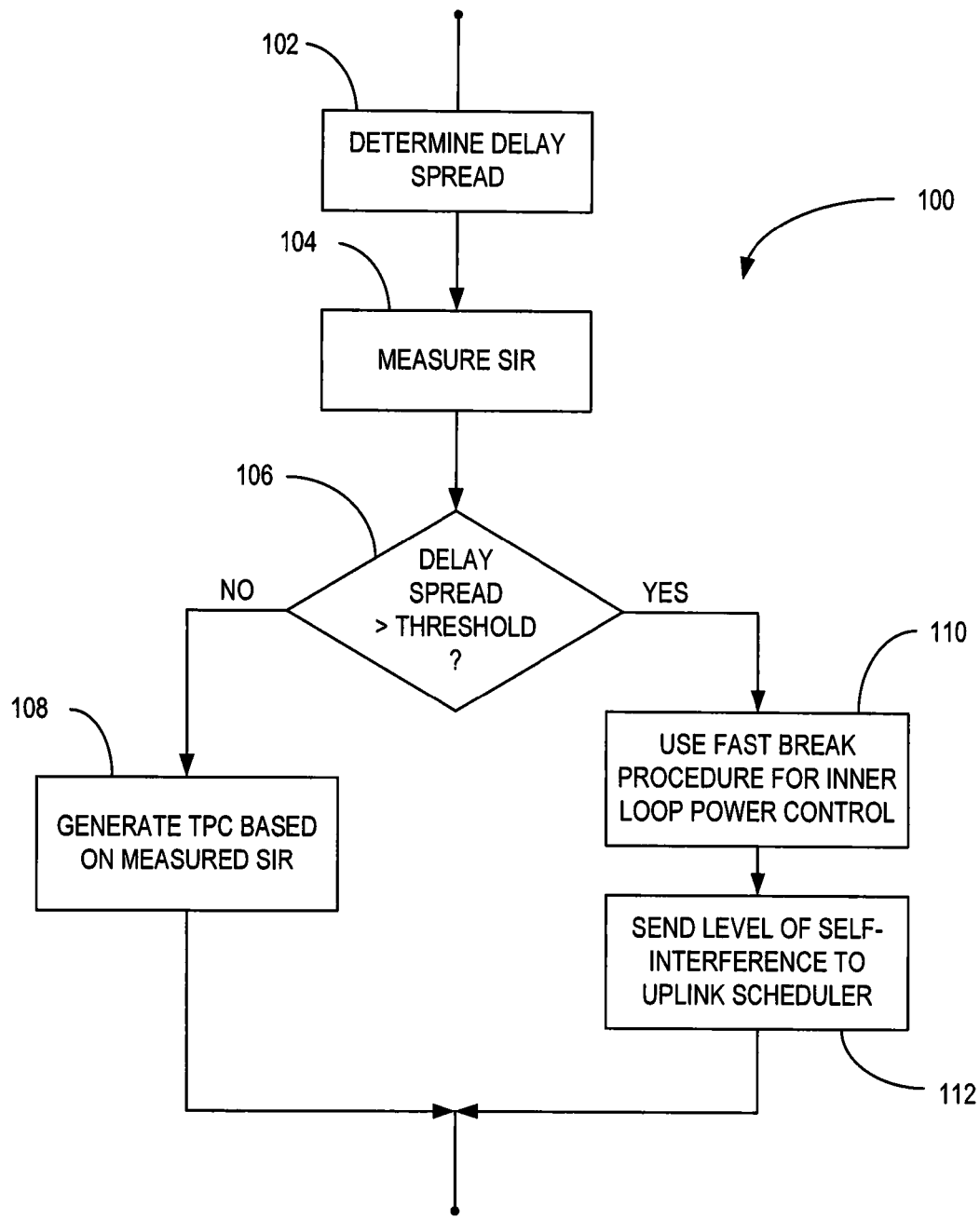
FIG. 2 is a flow diagram of an exemplary inner-loop power control procedure.

FIG. 2 illustrates an exemplary inner-loop power control process 100 implemented by the base station 20. This process is repeated during each power control interval. The process begins by determining the delay spread $\tau_{rms}$ of the channel (block 102) and measuring the SIR (block 104). After computing the delay spread of the channel, the base station 20 determines whether self-interference dominates other interference in the received SIR by comparing the delay spread to the threshold $\psi_{rms}$ (block 106). If self-interference is not dominant ($\tau_{rms} \leq \psi_{rms}$), inner-loop power control generates a transmit power control (TPC) command based on the measured SIR on the DPCCH (block 108). More particularly, the measured SIR is compared to the SIR target set by outer-loop power control. If the SIR is below the SIR target, the inner-loop power control generates a transmit power control (TPC) command instructing the mobile terminal 50 to increase its transmit power. Conversely, if the received SIR is greater than the SIR target, the inner-loop power control generates a TPC command instructing the mobile terminal 50 to decrease its transmit power. Returning to block 106, if self-interference is the dominant interference in the received SIR ($\tau_{rms} > \psi_{rms}$), inner-loop power control uses an alternate "fast break" command generation procedure to generate the TPC commands (block 110). For example, the inner-loop power control may be configured to generate a TPC command instructing the mobile terminal 50 to reduce its transmit power regardless of the relationship between the SIR and SIR target. Alternatively, the inner-loop power control may be configured to generate alternating TPC commands to maintain the current transmit power level of the mobile terminal 50. Other "fast break" procedures may also be used.

In some embodiments, an uplink scheduler at the base station 20 may be prevented from scheduling high data rate transmissions by the mobile terminal 50 when self-interference dominates the SIR. In this case, the delay spread may be provided to the scheduler so that the scheduler may take the level of self-interference into account when scheduling data rates for the mobile terminal 50 (block 112).

In some embodiments, the MSIR may be used in place of SIR for inner-loop power control. For example, the procedure shown in FIG. 2 may be implemented using MSIR instead of SIR for normal inner-loop power control. In this case, the MSIR is compared to the SIR target set by the outer-loop power control. The selection of either the SIR or MSIR for inner loop power control can be based on the estimated SIR or the estimated MSIR.

The delay spread of the channel can be estimated from the power delay profile (PDP) and delays reported by the path searcher. In a conventional RAKE or GRAKE receiver, the path searcher generates a PDP and estimates the delays $\hat{\tau}_k$ of the channel from the PDP. To determine delay spread, the base station 20 may first compute the total power P according to:

$$P = \sum_{k=0}^{N_P} PDP_{\hat{\tau}_k}. \quad (3)$$

Base station 20 then computes a center of gravity $\tau_{COG}$ for the delays $\hat{\tau}_k$ according to:

$$\tau_{COG} = \frac{1}{P} \sum_{k=0}^{N_P-1} PDP_{\hat{\tau}_k} \hat{\tau}_k. \quad (4)$$

Finally, the base station 20 computes the delay spread $\tau_{rms}$ based on the computed center of gravity $\tau_{COG}$ according to:

$$\tau_{rms} = \sqrt{\frac{1}{P} \sum_{k=0}^{N_P-1} PDP_{\hat{\tau}_k} \hat{\tau}_k^2 - \tau_{COG}^2}. \quad (5)$$

The SIR or MSIR can be computed in conventional manner. In a GRAKE receiver, the combining weights may be computed according to:

$$w = \hat{R}^{-1} \hat{h}, \quad (6)$$

where $\hat{h}$ represents the net channel response vector corresponding to the DPCCH and $\hat{R}$ represents an impairment covariance matrix. The impairment covariance matrix $\hat{R}$ in Equation (6) may be computed according to:

$$\hat{R} = f_1 R_{ISI}(\hat{g}) + f_2 R_n, \quad (7)$$

where $\hat{R}_{ISI}$ represents a matrix of parametrically-estimated self-interference impairment correlations representing the covariance of the intersymbol interference (ISI), $R_n$ represents a matrix representing the covariance of the thermal noise and other user interference, $\hat{g}$ represents the medium channel response estimate corresponding to the DPCCH, and the parameters $f_1$ and $f_2$ represent fitting parameters related to the base station transmit power and noise power, respectively. In one exemplary embodiment, $f_1 = E_C/E_P$ and $f_2 = N_0$, ignoring other user interference for simplicity, where $E_C$ represents the transmit power (energy per chip), $E_P$ represents pilot symbol energy, and $N_0$ represents thermal noise and other user interference power.

In a GRAKE receiver, the SIR of the received signal on the DPCCH may be computed according to:

$$SIR = \frac{(w^H \hat{h})^2}{f_1 w^H \hat{R}_{ISI}(\hat{g}) w + f_2 w^H R_n w}. \quad (8)$$

The quantities in Equation (8) may be computed using the parameter estimation portion of a parametric GRAKE as described in G. E. Bottomley, T. Ottosson and Y. E. Wang, A generalized RAKE Receiver for Interference Suppression, IEEE Journal on Selected Areas in Communications, vol. 18, no. 8, August 2000 (Bottomley et al) and in U.S. Pat. No. 7,539,240 titled "Method and apparatus for parameter estimation in a generalized RAKE receiver", both of which are incorporated herein by reference.

Figure 3:
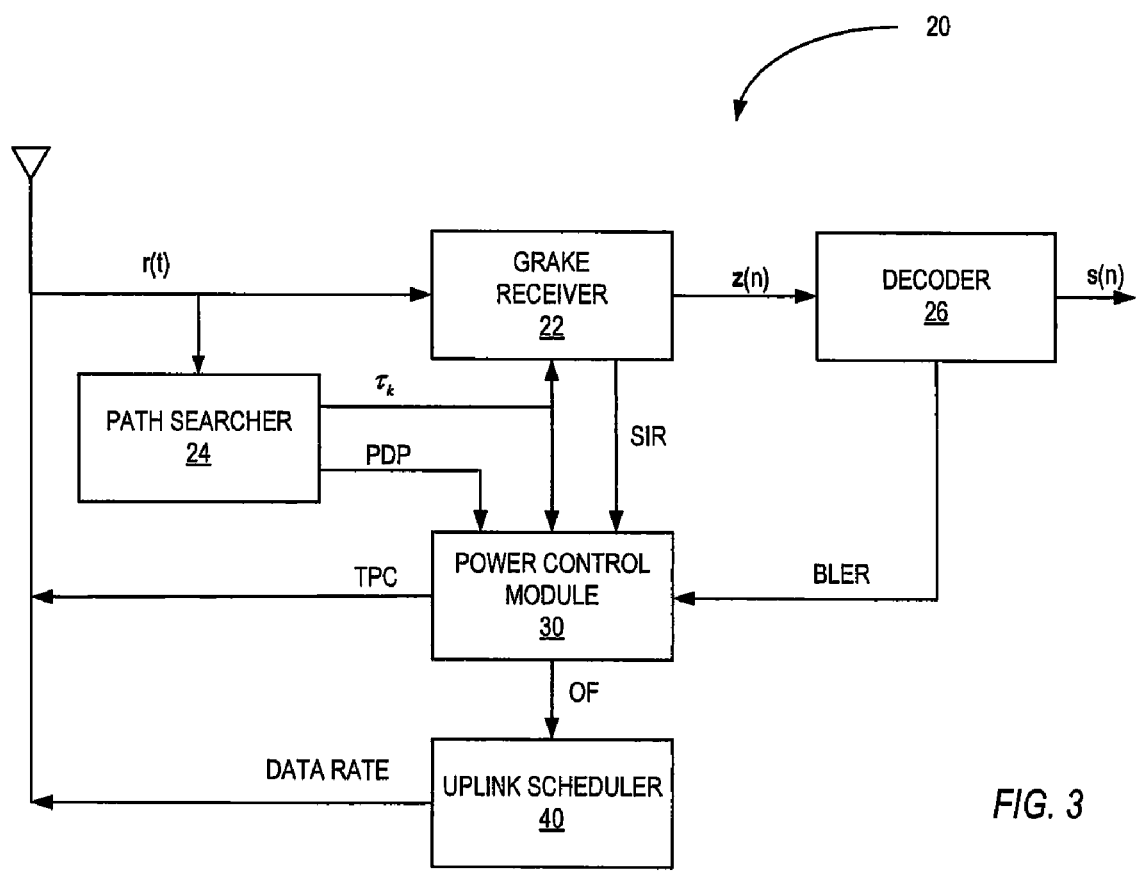
FIG. 3 is a block diagram of an exemplary base station in a mobile communication network.

The SIR estimate given by Equation (8) may be used for inner-loop power control as previously described by comparing the SIR estimate to an SIR target. The outer-loop power control module sets the SIR target in a conventional manner based on the block error rate (BLER) or frame error rate (FER) provided by a decoder 30 (FIG. 3). If MSIR is used instead of SIR for inner-loop power control, the first term in the denominator in Equation (8) is dropped and the MSIR may be computed according to:

$$MSIR = \frac{(w^H \hat{h})^2}{f_2 w^H R_n w}. \quad (9)$$

FIG. 3 illustrates an exemplary base station 20 for implementing the power control process as herein described. Base station 20 comprises a Generalized RAKE (GRAKE) receiver 22, path searcher 24, decoder 26, and power control module 30. The received signal r(t) is input to the GRAKE receiver 22. GRAKE receiver 22 may, for example, comprises a parametric GRAKE receiver as described in Bottomley et al and in U.S. Published Patent Application No. 2005/0201447. The GRAKE receiver 22 demodulates the received signal and provides a vector of the received symbol estimates z to the decoder 26. Path searcher 24 generates a PDP of the received signal and determines estimates the signal delays $\hat{\tau}_k$ of the multipath signal, which are used by the GRAKE receiver 22 for demodulation. Path searcher also provides the PDP and signal delays $\hat{\tau}_k$ to the power control module 30. During the demodulation process, GRAKE receiver 22 computes the SIR, or alternatively the MSIR, of the received signal. The computed SIR or MSIR is provided to the power control module 30. Decoder 26 decodes the received symbols and generates an estimate of the block error rate (BLER), which is also provided to the power control module 30. Based on the input from the GRAKE receiver 22, path searcher 24, and decoder 26, the power control module 30 performs inner-loop and outer-loop power control. The base station 20 may also include an uplink scheduler 40 for scheduling uplink transmissions from the mobile terminals 50.

Figure 4:
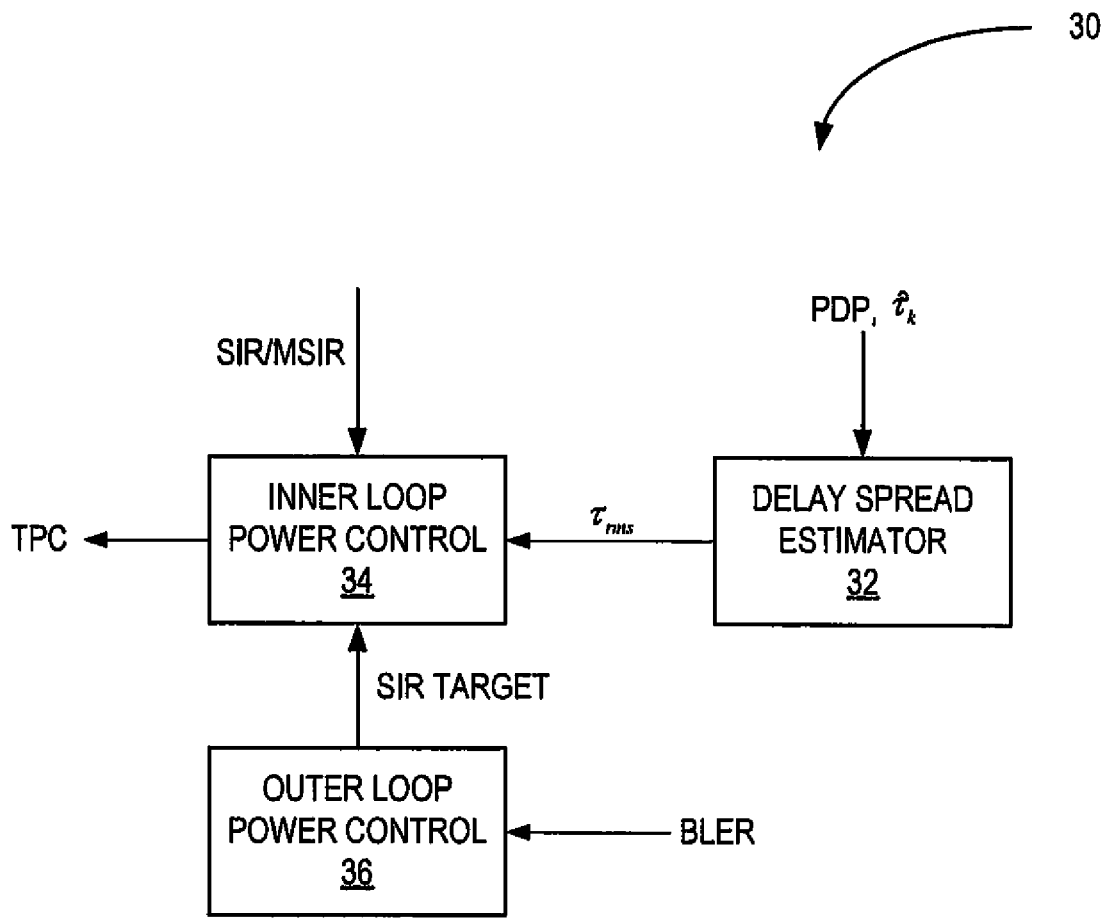
FIG. 4 is a block diagram of an exemplary power control unit for a base station in a mobile communication network.

FIG. 4 illustrates the main functional elements of the power control module 30. Power control module 30 comprises delay spread estimator 32, inner-loop power control unit 34, and outer-loop power control unit 36. The functional elements shown in FIG. 4 may be implemented by one or more processors, microcontrollers, hardware, or a combination thereof. Delay spread estimator 32 generates a delay spread estimate $\tau_{max}$ based on the PDP and signal delays reported by the path searcher 24, and provides the delay spread estimate to the inner loop power control unit 34. Inner-loop power control unit 34 performs inner-loop power control as shown in FIG. 2 based on the SIR and/or MSIR provided by the GRAKE receiver 22 and the delay spread $\tau_{rms}$ provided by the delay spread estimator 32. Outer-loop power control unit 36 generates the SIR target for the inner-loop power control based on the BLER from the decoder 26.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of controlling the transmit power of a mobile device in a mobile communication network, said method comprising:
    generating power control commands for controlling a transmit power of a mobile device by comparing a received signal quality of a received signal from the mobile device to a signal quality target;
    determining a delay spread of the received signal from the mobile device; and
    modifying power control command generation based on said delay spread so as to limit increases in the mobile device transmit power as the delay spread increases.

2. The method of claim 1 wherein determining a delay spread of the received signal from the mobile device comprises:
    determining a center of gravity of the received signal based on a power delay profile and estimated signal delays; and
    computing a delay spread based on the center of gravity.

3. The method of claim 1 wherein modifying power control command generation based on said delay spread comprises generating power control commands to reduce the mobile device transmit power irrespective of the signal quality of the received signal.

4. The method of claim 1 wherein modifying power control command generation based on said delay spread comprises generating power control commands to maintain the transmit power of the mobile device at a current transmit power level irrespective of the signal quality of the received signal.

5. The method of claim 1 wherein modifying power control command generation based on said delay spread comprises modifying the signal quality target.

6. A power control apparatus in a mobile communication network for controlling the transmit power of a mobile terminal comprising:
    a signal quality estimator for generating signal quality estimates corresponding to a received signal from the mobile terminal; and
    a power control module comprising an inner-loop power control unit to generate power control commands for controlling a transmit power of a mobile device based on said signal quality estimates, said inner-loop power control unit configured to:
        determine a delay spread of the received signal from the mobile device; and
        modify power control command generation based on said delay spread so as to limit increases in the mobile device transmit power as the delay spread increases.

7. The power control apparatus of claim 6 wherein the power control module computes the delay spread by:
    determining a center of gravity of the received signal based on a power delay profile and estimated signal delays; and
    computing a delay spread based on the center of gravity.

8. The power control apparatus of claim 6 wherein the inner-loop power control unit is configured to generate power control commands to reduce the mobile device transmit power irrespective of the signal quality of the received signal.

9. The power control apparatus of claim 6 wherein the inner-loop power control unit is configured to generate power control commands to maintain the transmit power of the mobile device at a current transmit power level irrespective of the signal quality of the received signal.

10. The power control apparatus of claim 6 wherein the power control module further comprises an outer-loop power control unit configured to modify the signal quality target when self-interference is the dominant impairment in the received signal.

* * * * *

UNITED STATES PATENT AND TRADEMARK OFFICE
CERTIFICATE OF CORRECTION

| | | |
|---|---|---|
| PATENT NO. | : 8,175,630 B2 | Page 1 of 1 |
| APPLICATION NO. | : 12/500856 | |
| DATED | : May 8, 2012 | |
| INVENTOR(S) | : Cairns | |

It is certified that error appears in the above-identified patent and that said Letters Patent is hereby corrected as shown below:

In Column 2, Line 10, delete "12/22,346" and insert -- 12/022,346 --, therefor.

In Column 6, Line 38, delete "et al)" and insert -- et al.) --, therefor.

In Column 6, Line 63, delete "et al" and insert -- et al. --, therefor.

In Column 7, Line 24, delete "$\tau_{max}$," and insert -- $\tau_{rms}$ --, therefor.

Signed and Sealed this
Twenty-third Day of October, 2012

David J. Kappos
*Director of the United States Patent and Trademark Office*